US010494035B2

(12) United States Patent
Abe et al.

(10) Patent No.: US 10,494,035 B2
(45) Date of Patent: Dec. 3, 2019

(54) VEHICLE BODY LOWER STRUCTURE

(71) Applicant: NISSAN MOTOR CO., LTD., Kanagawa (JP)

(72) Inventors: Kenichi Abe, Kanagawa (JP); Yukihiro Hamada, Kanagawa (JP); Yuichi Igarashi, Kanagawa (JP); Masamoto Ono, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 16/087,030

(22) PCT Filed: Mar. 22, 2016

(86) PCT No.: PCT/JP2016/058962
§ 371 (c)(1),
(2) Date: Sep. 20, 2018

(87) PCT Pub. No.: WO2017/163307
PCT Pub. Date: Sep. 28, 2017

(65) Prior Publication Data
US 2019/0092396 A1    Mar. 28, 2019

(51) Int. Cl.
*B62D 25/20*    (2006.01)
*B60N 2/005*    (2006.01)
(Continued)

(52) U.S. Cl.
CPC ......... *B62D 25/2036* (2013.01); *B60N 2/005* (2013.01); *B62D 25/025* (2013.01); *B62D 21/157* (2013.01)

(58) Field of Classification Search
CPC .... B62D 21/06; B62D 21/152; B62D 25/025; B62D 25/20; B62D 25/2009; B62D 25/2018; B62D 25/2036; B62D 25/2045
(Continued)

(56) References Cited

U.S. PATENT DOCUMENTS 6,145,923 A * 11/2000 Masuda ............... B62D 25/082
                                                                                   296/1.03
8,052,204 B2    11/2011    Boettcher et al.
(Continued)

FOREIGN PATENT DOCUMENTS

CN    102596692 A    7/2012
JP    2001-219873 A    8/2001
(Continued)

*Primary Examiner* — Jason S Daniels
(74) *Attorney, Agent, or Firm* — Osha Liang LLP (57) ABSTRACT

A vehicle body lower structure includes a side sill, a center tunnel, a floor panel disposed between the side sill and the center tunnel, a first frame member connected to a front side member, and a second frame member connected to the front side member. The first frame member extends obliquely such that, as the first frame member extends further rearward, the first frame member extends further outward in a vehicle width direction. The second frame member is connected to the side sill. The second frame member extends obliquely such that, as the second frame member extends further rearward, the second frame member extends further inward in the vehicle width direction. The second frame member is connected to the center tunnel. One of the first frame member and the second frame member is provided on an upper surface of the floor panel.

9 Claims, 8 Drawing Sheets

(51) Int. Cl.
*B62D 25/02* (2006.01)
*B62D 21/15* (2006.01)

(58) Field of Classification Search
USPC .......................................... 296/193.07, 209
See application file for complete search history.

(56) References Cited

U.S. PATENT DOCUMENTS

| | | |
|---|---|---|
| 8,177,293 B2 | 5/2012 | Boettcher |
| 8,276,980 B2 | 10/2012 | Boettcher et al. |
| 8,439,430 B2 * | 5/2013 | Sato .................. B62D 25/2018 |
| | | 296/187.08 |
| 8,668,248 B2 * | 3/2014 | Ishizono .............. B62D 25/025 |
| | | 296/187.08 |
| 8,960,776 B2 | 2/2015 | Boettcher et al. |
| 9,422,010 B2 | 8/2016 | Boettcher et al. |
| 2008/0258498 A1 | 10/2008 | Philip et al. |
| 2011/0272972 A1 * | 11/2011 | Takayanagi ........... B62D 25/02 |
| | | 296/204 |
| 2012/0274100 A1 | 11/2012 | Mildner et al. |
| 2013/0341969 A1 * | 12/2013 | Fujii ................. B62D 25/2036 |
| | | 296/193.07 |

FOREIGN PATENT DOCUMENTS

| | | |
|---|---|---|
| JP | 2006-264541 A | 10/2006 |
| JP | 2008-230460 A | 10/2008 |

* cited by examiner

VEHICLE BODY LOWER STRUCTURE

BACKGROUND

Technical Field

The present disclosure relates to a vehicle body lower structure of a vehicle such as a car.

Related Art

The vehicle body lower structure of Patent Literature 1 includes front side members which each have a main body portion on the engine room side and a rear portion extending below a vehicle cabin. The rear portion of the front side member is bent obliquely outward and toward the rear of the vehicle and a rear end of the rear portion is coupled to a rocker rail. A reinforcement member extending obliquely inward and toward the rear of the vehicle is coupled to a vehicle inner side surface of a bent portion of the front side member. The rear portion of the front side member and the reinforcement member extend along a floor panel.

PATENT LITERATURE

Patent Literature 1: Japanese Patent Application Publication No. 2001-219873

SUMMARY OF INVENTION

However, the aforementioned two frame members (the rear portion of the front side member and the reinforcement member) are both joined to a lower surface of the floor panel. Accordingly, the centers of cross sections of the two frame members are located below the floor panel and are greatly spaced away from the center of a cross section of the main body portion of the front side member in the height direction. In the vehicle body lower structure of Patent Literature 1, since the centers of the cross sections of the frame members are greatly spaced away from the center of the cross section of the main body portion of the front side member, bending deformation tends to occur (axial crushing is less likely to occur) in the two frame members when the two frame members are deformed by collision load inputted into the main body portion of the front side member from the vehicle body front side.

One or more embodiments of the present invention may facilitate axial crushing of frame members extending along a floor panel when the frame members are deformed by the aforementioned collision load.

A vehicle body lower structure according to one or more embodiments of the present invention includes first and second frame members connected to a front side member. The first frame member extends obliquely such that the first frame member is located more outward in a vehicle width direction as extending toward a vehicle body rear side, and the second frame member extends obliquely such that the second frame member is located more inward in the vehicle width direction as extending toward the vehicle body rear side. One of the first and second frame members is provided on an upper surface of the floor panel and the other one is provided on a lower surface of the floor panel.

In the aforementioned structure, one of the first and second frame members is provided on an upper surface of the floor panel and the other one is provided on a lower surface of the floor panel. Accordingly, the height difference between the center of a cross section of a front side member main body portion and the center of a cross section of both frame members is smaller than that in the case where both frame members are provided on the lower surface of the floor panel. Thus, it is possible to reduce moment inputted into the first and second frame members by collision load inputted into the main body portion of the front side member from the vehicle body front side in vehicle front collision. This can further facilitate the axial crushing of the first and second frame members when the first and second frame members are deformed by the aforementioned collision load.

BRIEF DESCRIPTION OF DRAWINGS

FIGS. 5(a)-5(b) are cross-sectional views of the vehicle body lower structure in FIG. 1.

FIGS. 6(a)-6(b) are views illustrating operations and possible effects of the vehicle body lower structure in FIG. 1.

FIGS. 8(a)-8(c) are cross-sectional views of the vehicle body lower structure in FIG. 7.

DETAILED DESCRIPTION

Several embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In the following description, a front side in a vehicle body front-rear direction is referred to as "front side" or "vehicle body front side," front in the vehicle body front-rear direction is referred to as "front," a rear side in the vehicle body front-rear direction is referred to as "rear side" or "vehicle body rear side," and rear in the vehicle body front-rear direction is referred to as "rear" in some cases. Moreover, "hat-shaped cross section" is a cross section including a channel-shaped cross section portion which has an opening and a pair of flange portions which extend outward respectively from the opening side ends of the channel-shaped cross section.

<First Embodiment>

A vehicle body lower structure S1 according to a first embodiment is described with reference to FIGS. 1 to 6(b).

Figure 1:
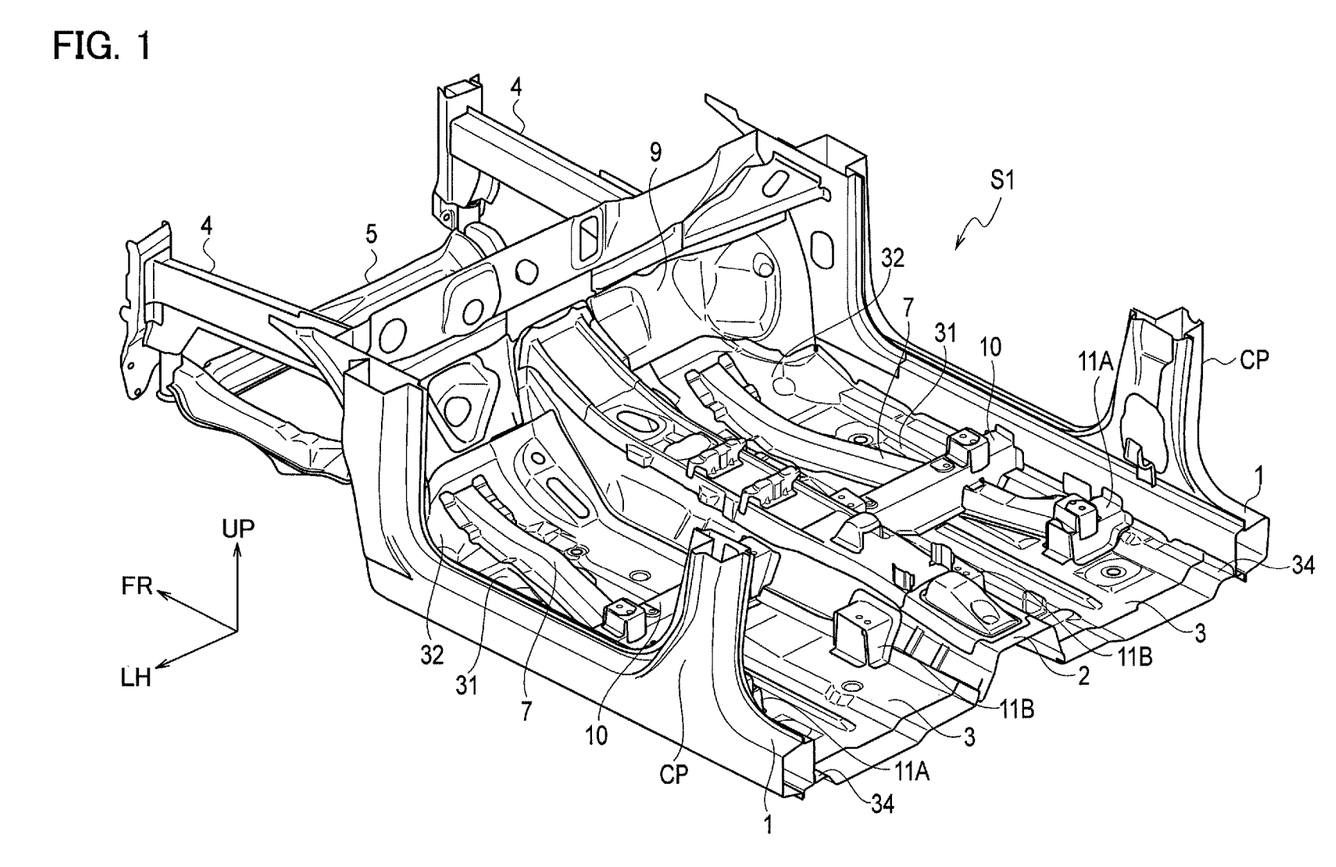
FIG. 1 is a perspective view illustrating a vehicle body lower structure according to a first embodiment of the present invention.
Figure 2:
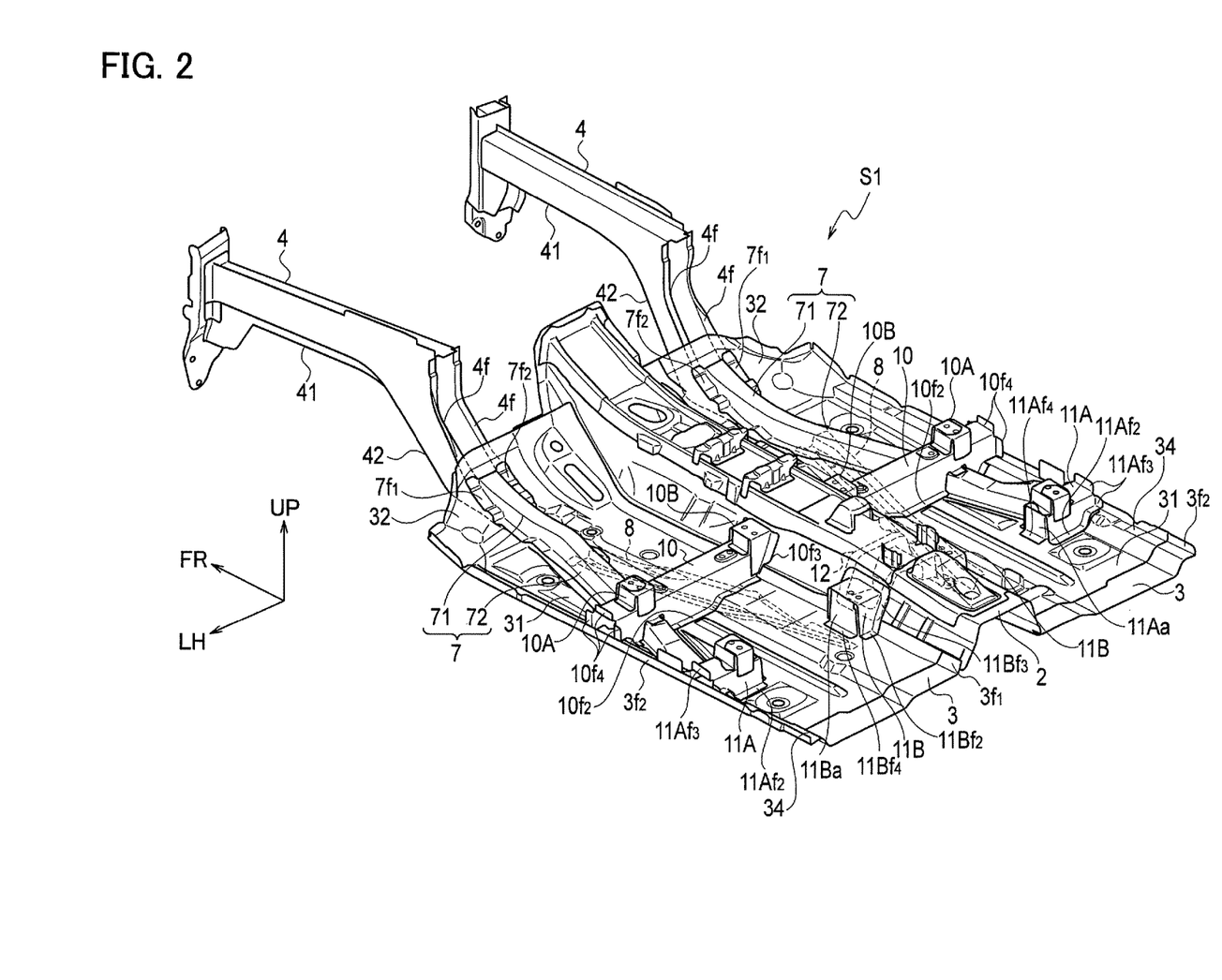
FIG. 2 is a perspective view illustrating a main portion of the vehicle body lower structure in FIG. 1.

As illustrated in FIGS. 1 and 2, the vehicle body lower structure S1 includes side sills 1 which are paired left and right vehicle body frame members extending in the vehicle body front-rear direction, a center tunnel 2 which is a vehicle body frame member extending in the vehicle body front-rear direction, and paired left and right floor panels 3 each disposed between the center tunnel 2 and the corresponding one of the left and right side sills 1.

Front side members 4 which are paired left and right vehicle body frame members extending in the vehicle body front-rear direction are provided on the vehicle body front side of the vehicle body lower structure S1. A front suspension member 5 with a square frame shape in a plan view is arranged below the front side members 4. A front portion of the front suspension member 5 is attached to front end portions of the front side member 4 directly or via rubber mounts and the like, and a rear portion of the front suspension member 5 is attached to rear end portions of the front side members 4 directly or via rubber mounts and the like. The front suspension member 5 supports not-illustrated power train, suspension links, and the like.

Figure 3:
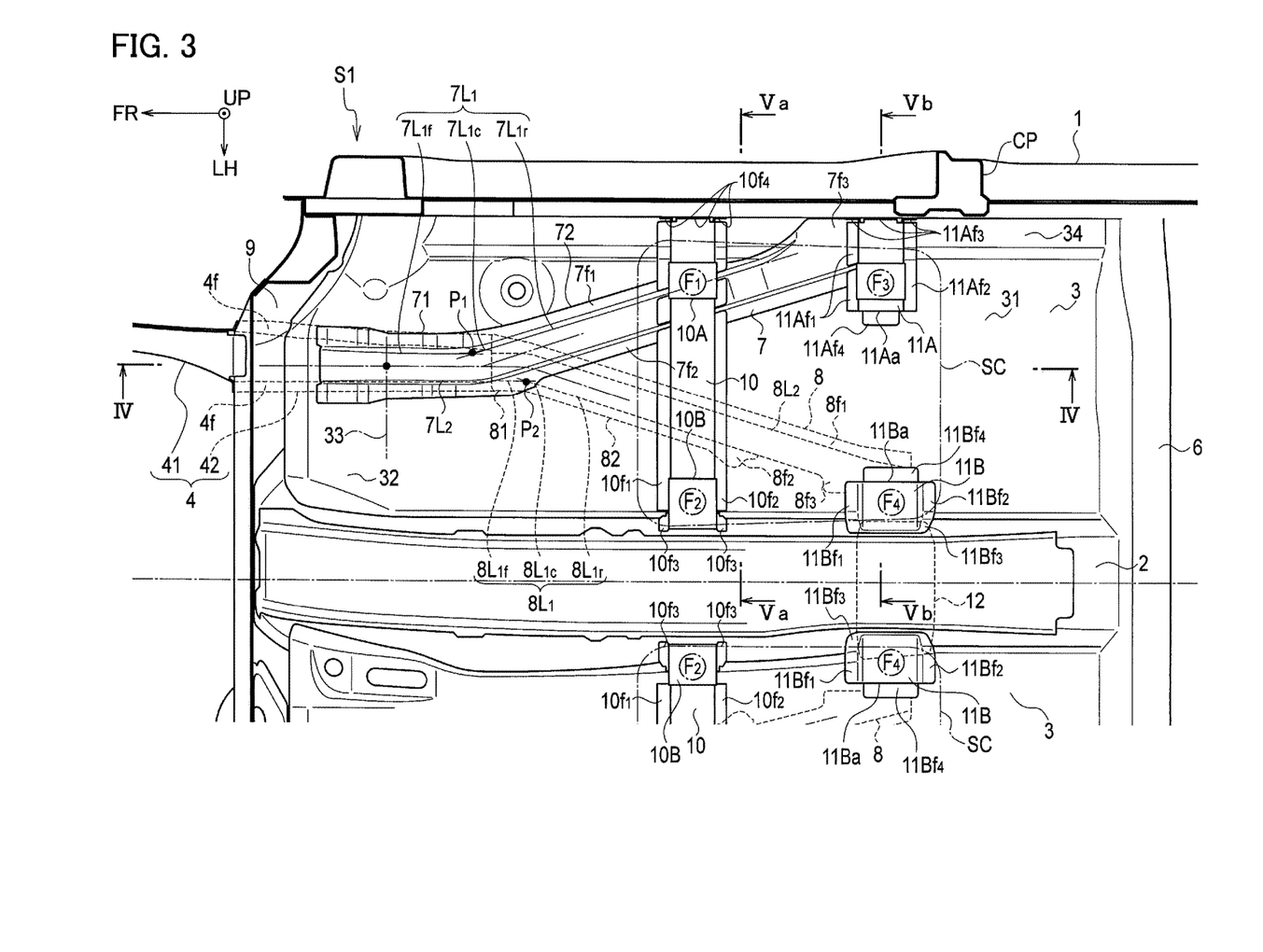
FIG. 3 is a plan view of the vehicle body lower structure in FIG. 1.

As illustrated in FIG. 3, a rear portion of the vehicle body lower structure S1 is provided with a seat cross member 6 which is a vehicle body frame member extending in a vehicle width direction. A vehicle width direction center portion of the seat cross member 6 is connected to a rear end portion of the center tunnel 2 and both end portions of the seat cross member 6 in the vehicle width direction are connected to the left and right side sills 1. A front side surface of the seat cross member 6 is joined to rear end edges of the center tunnel 2 and the floor panels 3.

Figure 4:
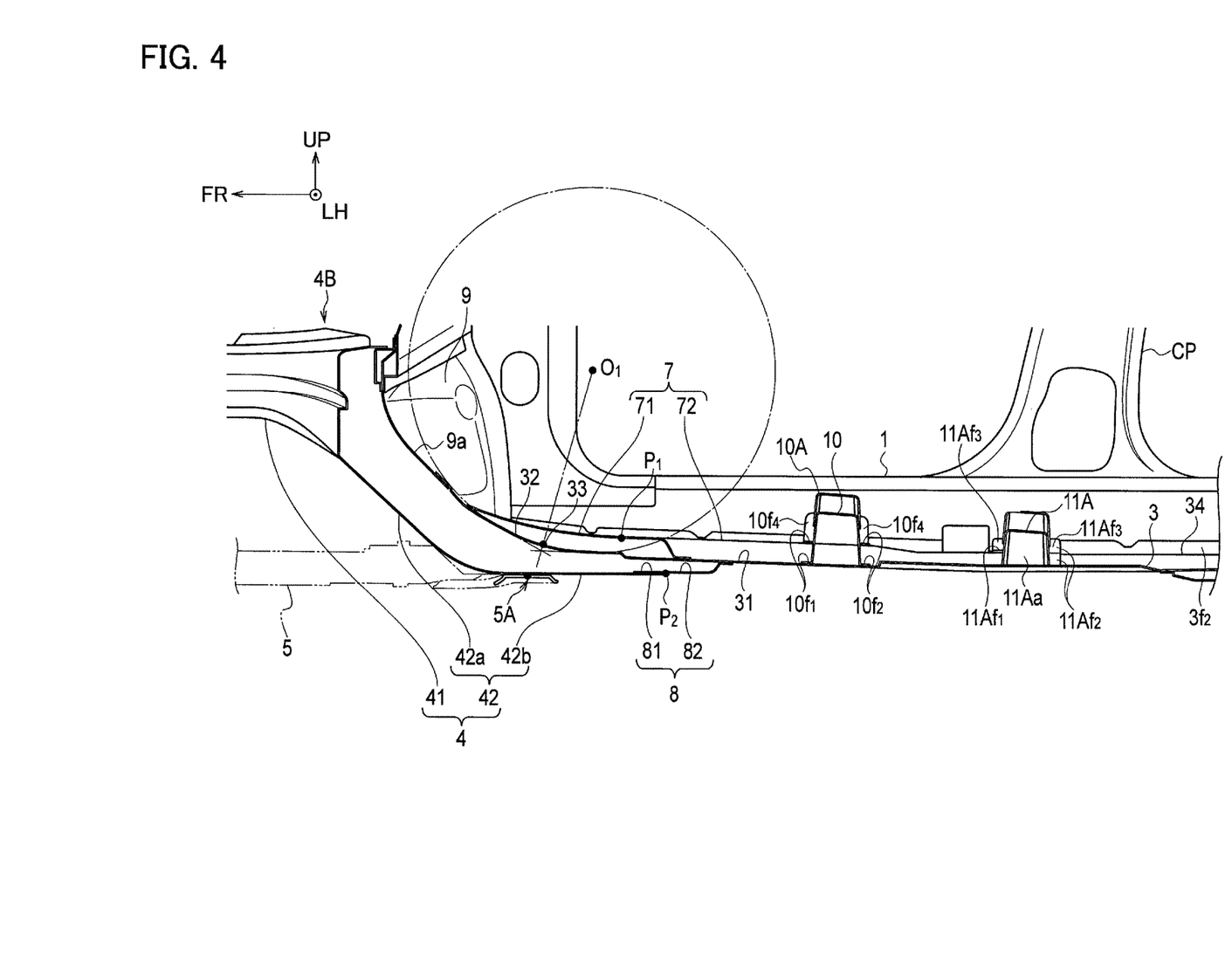
FIG. 4 is a cross-sectional view along the line IV-IV in FIG. 3.

As illustrated in FIGS. 1 and 4, an upper surface of each floor panel 3 is provided with a front side member extension (hereafter, referred to as first frame member) 7 which is a vehicle body frame member connected to the corresponding front side member 4. Moreover, as illustrated in FIGS. 2 to 4, a lower surface of each floor panel 3 is provided with a second frame member 8 which is a vehicle body frame member connected to the corresponding front side member 4 and the corresponding first frame member 7.

Each first frame member 7 obliquely extends from a connection portion with the front side member 4 such that the first frame member 7 is located more outward in the vehicle width direction as extending toward the vehicle body rear side. Each second frame member 8 obliquely extends from a connection portion with the front side member 4 and the first frame member 7 such that the second frame member 8 is located more inward in the vehicle width direction as extending toward the vehicle body rear side. In other words, the front side member 4, the first frame member 7, and the second frame member 8 form a vehicle body frame member whose vehicle body rear side portion is bifurcated into two in the plan view.

More specifically, as illustrated in FIG. 3, each first frame member 7 includes a front portion 71 which extends substantially linearly from the rear end portion of the front side member 4 in the vehicle body front-rear direction and a rear portion 72 which extends substantially linearly from a rear end of the front portion 71 in a direction outward in the vehicle width direction and toward the vehicle body rear side. The front portion 71 is arranged such that the center axis thereof substantially coincides with the center axis of the rear end portion of the front side member 4 in the plan view. A rear end of the rear portion 72 or a vehicle width direction outer end of the first frame member 7 is connected to the side sill 1 near a base portion of a center pillar CP.

Moreover, as illustrated in FIG. 3, each second frame member 8 includes a front portion 81 which extends substantially linearly in the vehicle body front-rear direction and a rear portion 82 which extends substantially linearly from a rear end of the front portion 81 in a direction inward in the vehicle width direction and toward the vehicle body rear side. The front portion 81 is arranged such that the center axis thereof substantially coincides with the center axis of the front portion 71 of the first frame member 7 and the center axis of the rear end portion of the front side member 4 in the plan view. The front portion 81 partially overlaps the rear portion 72 of the first frame member 7 in the plan view. A rear end of the rear portion 82 or a vehicle width direction inner end of the second frame member 8 is connected to the center tunnel 2 at substantially the same position, in the vehicle body front-rear direction, as the connection portion between the rear portion 72 of the first frame member 7 and the side sill 1.

As illustrated in FIGS. 3 and 4, each floor panel 3 includes a main surface portion 31 which extends substantially horizontally and a toe board portion (tilted surface portion) 32 which is arranged adjacent to and on the front side of the main surface portion 31 and which is tilted upward toward the front side relative to the main surface portion 31. A front end edge of the toe board portion 32 is joined to a lower end edge of a dash panel 9. A rear end edge of the toe board portion 32 that is a front end edge portion of the main surface portion 31 is also referred to as a toe board kick portion 33. As illustrated in FIG. 4, the floor panel 3 of the first embodiment forms a smoothly curved surface in the toe board kick portion 33. For example, the position of the toe board kick portion 33 can be determined to be a point where a straight line passing the center $O_1$ of the curvature of a connection portion between the toe board portion 32 and the main surface portion 31 and an intersection between an extended line of the toe board portion 32 and an extended line of the main surface portion 31 intersects the floor panel 3 in a cross section perpendicular to the vehicle width direction.

As illustrated in FIG. 4, each front side member 4 is bent downward at a bent portion 4B near the dash panel 9 and includes a main body portion 41 arranged on the vehicle body front side of the bent portion 4B and a rear portion 42 arranged below and on the vehicle body rear side of the bent portion 4B. The main body portion 41 has a closed cross section structure and extends substantially linearly in the vehicle body front-rear direction on the vehicle body upper side of the main surface portion 31 of the floor panel 3 to be located away from the main surface portion 31 by a predetermined distance. The rear portion 42 extends from the bent portion 4B toward the vehicle body rear side and the lower side to extend below the floor panel 3.

The rear portion 42 of the front side member 4 includes a tilted portion 42a which extends obliquely in a direction downward and toward the vehicle body rear side and which is bent toward the vehicle body rear side near the toe board kick portion 33 and a lower extended portion 42b which extends substantially horizontally from a lower end of the tilted portion 42a toward the vehicle body rear side. The tilted portion 42a extends along a tilted surface portion 9a in a lower portion of the dash panel 9 and an upper portion of the toe board portion 32. The lower extended portion 42b extends along a lower portion of the toe board portion 32 and a front portion of the main surface portion 31.

The tilted portion 42a has a hat-shaped cross section open rearward and flange portions 4f of the tilted portion 42a are joined to a front surface of the tilted surface portion 9a of the dash panel 9 and a front surface of the upper portion of the toe board portion 32. The lower extended portion 42b has a hat-shaped cross section open upward and flange portions 4f of the lower extended portion 42b are joined to a front surface of the lower portion of the toe board portion 32 and a lower surface of the front portion of the main surface portion 31. The tilted portion 42a and the lower extended portion 42b thereby form a closed cross section together with the dash panel 9 and the floor panel 3.

As illustrated in FIG. 4, the rear portion of the front suspension member 5 is attached to a lower surface of a rear end portion of the front side member 4, at attachment points 5A located on the vehicle body front side of the toe board kick portion 33. The rear end portion of the front side member 4 in first the embodiment is a portion of the rear portion 42 of the front side member 4 which is located below the front end edge of the toe board portion 32 and is formed of a lower portion of the tilted portion 42a and the lower extended portion 42b.

Figure 5A:
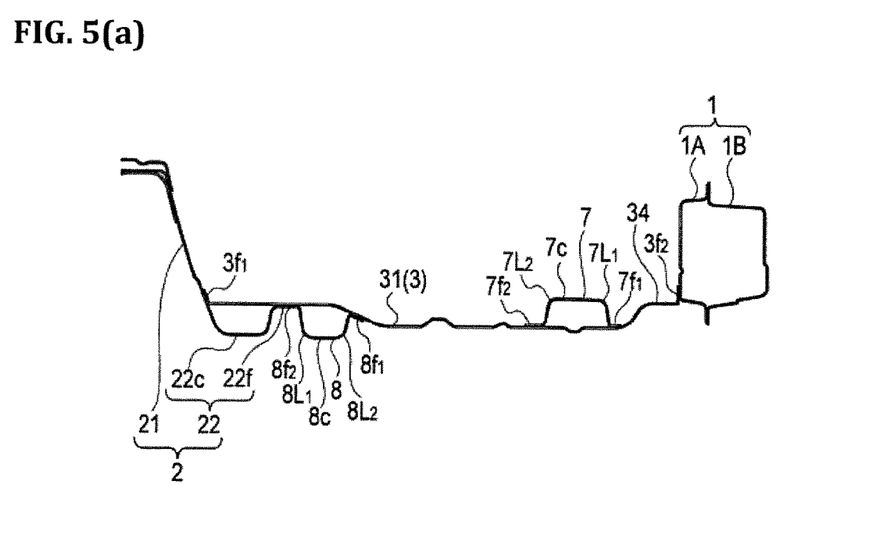
FIG. 5(a) illustrates a cross section along the line Va-Va in FIG. 3
Figure 5B:
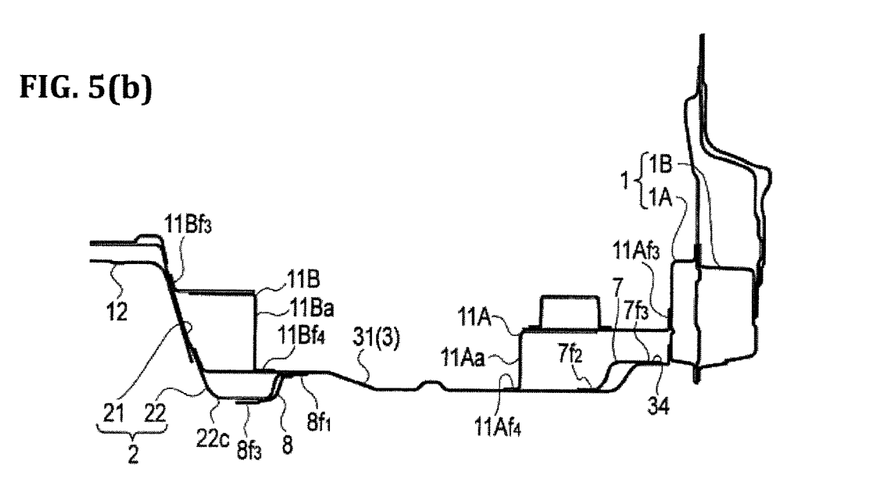
FIG. 5(b) illustrates a cross section along the line Vb-Vb in FIG. 3.

As illustrated in FIGS. 5(a)-5(b), in each floor panel 3, there are formed an inner flange portion $3f_1$ which extends upward from a vehicle width direction inner end edge of the floor panel 3 and an outer flange portion $3f_2$ which extends upward from a vehicle width direction outer end edge of the floor panel 3. The inner flange portion $3f_1$ is joined to a vehicle width direction outer side surface of the center tunnel 2 and the outer flange portion $3f_2$ is joined to a vehicle width direction inner side surface of the side sill 1. Moreover, a step portion 34 which is formed to be raised from the main surface portion 31 is provided along the side sill 1, near the vehicle width direction outer end edge of each floor panel 3.

Each first frame member 7 has a hat-shaped cross section opening downward as illustrated in FIG. 5(a), over the entire length thereof. Flange portions $7f_1$, $7f_2$ of each first frame member 7 are joined to the upper surface of the floor panel 3 and the first frame member 7 forms a closed cross section together with the floor panel 3. The flange portions $7f_1$, $7f_2$ in the front portion 71 of the first frame member 7 are joined to the flange portions 4f of the front side member 4 and the floor panel 3 while being arranged such that the flange portions $7f_1$, $7f_2$ and the flange portions 4f in the rear end portion of the front side member 4 sandwich the lower portion of the toe board portion 32 and the front portion of the main surface portion 31 from above and below. In other words, the first frame member 7 is connected to the rear end portion of the front side member 4 with part of the floor panel 3 provided therebetween.

As illustrated in FIG. 4, a closed space in the closed cross section structure formed by the first frame member 7 and the floor panel 3 and a closed space in the closed cross section structure formed by the rear portion 42 of the front side member 4, the dash panel 9, and the floor panel 3 are adjacent to each other, while being separated by the floor panel 3. Moreover, the closed space in the closed cross section structure formed by the first frame member 7 and the floor panel 3 and a closed space in the closed cross section structure formed by the front portion 81 of the second frame member 8 and the floor panel 3 are adjacent to each other while being separated by the floor panel 3.

As illustrated in FIG. 3 and FIG. 5(b), a flange portion $7f_3$ extending outward in the vehicle width direction is formed in the rear end of the rear portion 72 of each first frame member 7. The flange portion $7f_3$ extends to a vicinity of the vehicle width direction inner side surface of the side sill 1 and is joined to an upper surface of the step portion 34 of the floor panel 3.

Each second frame member 8 has a hat-shaped cross section opening upward as illustrated in FIG. 5(a), over the entire length thereof. Flange portions $8f_1$, $8f_2$ of each second frame member 8 are joined to the lower surface of the floor panel 3 and the second frame member 8 forms a closed cross section together with the floor panel 3. The flange portions $8f_1$, $8f_2$ in the front portion 81 of the second frame member 8 are joined to the floor panel 3 and part of the flange portions $7f_1$, $7f_2$ in the rear portion 72 of the first frame member 7 while being arranged such that the flange portions $8f_1$, $8f_2$ and the part of the flange portions $7f_1$, $7f_2$ sandwich the main surface portion 31 of the floor panel 3 from above and below. In other words, the second frame member 8 is connected to the first frame member 7 with part of the floor panel 3 provided therebetween. Moreover, as illustrated in FIG. 4, a front end of the front portion 81 of the second frame member 8 is arranged to overlap a rear end of the lower extended portion 42b of the front side member 4 and is directly joined thereto, on the rear side of the attachment point 5A of the front suspension member 5.

As illustrated in FIG. 4, the closed cross section structure formed by the second frame member 8 and the floor panel 3 is connected to the closed cross section structure formed by the rear portion 42 of the front side member 4, the dash panel 9, and the floor panel 3 to be smoothly continuous therewith. In this connection portion, the closed spaces defined by the two closed cross section structures are continuous.

As illustrated in FIG. 5(a), in a cross section perpendicular to the vehicle body front-rear direction, the center tunnel 2 includes a center portion 21 which has an inverted U-shape cross section opening downward and tunnel reinforcement portions 22 which are provided on both sides of the center portion 21 in the vehicle width direction and which extends in the vehicle body front-rear direction. Each of the tunnel reinforcement portions 22 includes a channel-shaped cross section portion 22c opening upward and a flange portion 22f extending outward in the vehicle width direction from a vehicle width direction outer end edge of the channel-shaped cross section portion 22c. The flange portion 22f of the tunnel reinforcement portion 22 is joined to the lower surface of the floor panel 3 and the inner flange portion $3f_1$ of the floor panel 3 is joined to a side surface of the center portion 21 of the center tunnel 2 and the tunnel reinforcement portion 22 thereby forms a closed cross section together with the floor panel 3.

As illustrated in FIG. 3 and FIG. 5(b), a flange portion $8f_3$ extending inward in the vehicle width direction is formed in the rear end of the rear portion 82 of each second frame member 8, and is joined to a lower surface of the tunnel reinforcement portion 22.

As illustrated in FIG. 5(a), each side sill 1 has a closed cross section structure obtained by joining flange portions of a sill inner 1A having a hat-shaped cross section opening outward in the vehicle width direction and a sill outer 1B having a hat-shaped cross section opening inward in the vehicle width direction.

As illustrated in FIG. 3, in the vehicle body lower structure S1, the first frame member 7 is bent outward in the vehicle width direction and toward the vehicle body rear side at a first bent point $P_1$ located on the vehicle body rear side of the toe board kick portion 33, away therefrom by a predetermined distance in the plan view. The front portion 71 of the first frame member 7 is located on the front side of the first bent point $P_1$, and the rear portion 72 is located on the rear side of the first bent point $P_1$. Moreover, the second frame member 8 is bent inward in the vehicle width direction and toward the vehicle body rear side at a second bent point $P_2$ located on the vehicle body rear side of the first bent point $P_1$, away therefrom by a predetermined distance. The front portion 81 of the second frame member 8 is located on the front side of the second bent point $P_2$, and the rear portion 82 is located on the rear side of the second bent point $P_2$. The first and second bent points $P_1$, $P_2$ are located on the vehicle body front side of a seat cushion front end of a vehicle seat SC.

Moreover, as illustrated in FIG. 3, both end edges, in the vehicle width direction, of an upper surface (flat portion) of a channel-shaped cross section portion $7_c$ in the first frame member 7 form paired ridge lines $7L_1$, $7L_2$ extending substantially parallel to each other in a longitudinal direction of the first frame member 7. The ridge line $7L_1$ on the vehicle width direction outer side out of the paired ridge lines includes, for example, a linear front ridge line $7L_{1f}$ located in the front portion 71 of the first frame member 7, a linear rear ridge line $7L_{1r}$ located in the rear portion 72 of the first frame member 7, and a curved connection portion $7L_{1c}$ smoothly connecting the ridge lines $7L_{1f}$, $7L_{1r}$. A point where the ridge line $7L_1$ is bent in the plan view corresponds to the aforementioned first bent point $P_1$. For example, the position of the first bent point $P_1$ can be determined to be a point where a straight line passing the center of the curvature of the curved connection portion $7L_{1c}$ and an intersection between an extended line of the front ridge line $7L_{1f}$ and an extended line of the rear ridge line $7L_{1r}$ intersects the curved connection portion $7L_{1c}$ in the plan view.

Similarly, both end edges, in the vehicle width direction, of a lower surface (flat portion) of a channel-shaped cross section portion $8_c$ in the second frame member 8 form paired ridge lines $8L_1$, $8L_2$ extending substantially parallel to each other in a longitudinal direction of the second frame member 8. The ridge line $8L_1$ on the vehicle width direction inner side out of the paired ridge lines includes, for example, a linear front ridge line $8L_{1f}$ located in the front portion 81 of the second frame member 8, a linear rear ridge line $8L_{1r}$ located in the rear portion 82 of the second frame member 8, and a curved connection portion $8L_{1c}$ smoothly connecting the ridge lines $8L_{1f}$, $8L_{1r}$. A point where the ridge line $8L_1$ is bent in the plan view corresponds to the aforementioned second bent point $P_2$. For example, the position of the second bent point $P_2$ can be determined to be a point where a straight line passing the center of the curvature of the curved connection portion $8L_{1c}$ and an intersection between an extended line of the front ridge line $8L_{1f}$ and an extended line of the rear ridge line $8L_{1r}$ intersects the curved connection portion $8L_{1c}$ in the plan view.

According to one or more embodiments of the present invention, a distance between the toe board kick portion 33 and the first bent point $P_1$ in the vehicle body front-rear direction is set to at least 100 mm or more but is not limited to this. The distance can be selected as appropriate from the viewpoint of providing room for absorbing energy in vehicle body deformation to be described later, providing a space for occupants, improving torsional rigidity of the vehicle body lower portion, and the like.

Moreover, according to one or more embodiments of the present invention, a distance between the first bent point $P_1$ and second bent point $P_2$ in the vehicle body front-rear direction is set to 100 mm or more but is not limited to this. The distance can be selected as appropriate from the viewpoint of providing a space for occupants in vehicle body deformation to be described later, reducing deceleration in belt restraint, improving load transmission efficiency via the second frame member 8 in one-side collision, and the like.

As illustrated in FIGS. 1 to 3, a front cross member 10 may be arranged on the upper surface of each floor panel 3, at a position on the vehicle body rear side of the second bent point $P_2$ and on the vehicle body front side of the center pillar CP. The front cross member 10 is a vehicle body frame member which linearly extends in the vehicle width direction. A vehicle width direction inner end of the front cross member 10 is joined to the vehicle width direction outer side surface of the center tunnel 2 and a vehicle width direction outer end of the front cross member 10 is joined to the vehicle width direction inner side surface of the side sill 1. In the plan view, the front cross member 10 intersects a longitudinal direction center portion of the rear portion 72 of the first frame member 7 and a longitudinal direction center portion of the rear portion 82 of the second frame member 8 and is connected to the first and second frame members 7, 8 at the respective intersecting portions.

As illustrated in FIG. 4, the front cross member 10 has a hat-shaped cross section opening downward. Flange portions $10f_1$, $10f_2$ of the front cross member 10 are joined to the upper surface of the floor panel 3 and the upper surface of the first frame member 7 and the front cross member 10 thereby forms a closed cross section with these surfaces. As illustrated in FIG. 3, flange portions $10f_3$ extending forward and rearward from a vehicle width direction inner end edge of the front cross member 10 are formed in the vehicle width direction inner end of the front cross member 10. These flange portions $10f_3$ are joined to the vehicle width direction outer side surface of the center portion 21 of the center tunnel 2. Moreover, flange portions $10f_4$ extending upward, forward, and rearward from a vehicle width direction outer end edge of the front cross member 10 are formed in the vehicle width direction outer end of the front cross member 10. These flange portions $10f_4$ are joined to the vehicle width direction inner side surface of the sill inner 1A. Paired front sheet brackets 10A, 10B are arranged and fixed on an upper surface of the front cross member 10 to be spaced away from each other in the vehicle width direction.

As illustrated in FIGS. 1 and 3, paired rear seat brackets 11A, 11B may be arranged at positions on the vehicle body rear side of the front cross member 10, away therefrom by predetermined distances, on the upper surface of each floor panel 3. The rear seat brackets 11A, 11B are arranged at substantially the same position in the vehicle body front-rear direction and spaced away from each other in the vehicle width direction. The rear seat bracket (hereafter, referred to as outer rear seat bracket) 11A on the vehicle width direction outer side is connected to the side sill 1 and the rear end of the rear portion 72 of the first frame member 7, near the base portion of the center pillar CP. The rear seat bracket (hereafter, referred to as inner rear seat bracket) 11B on the vehicle width direction inner side is connected to the center tunnel 2 and the rear end of the rear portion 82 of the second frame member 8.

The outer rear seat bracket 11A has a hat-shaped cross section opening downward in a cross section perpendicular to the vehicle width direction. As illustrated in FIG. 3, flange portions $11Af_1$ of the outer rear seat bracket 11A are joined to the upper surface of the floor panel 3 and the upper surface of the first frame member 7, and a flange portion $11Af_2$ is joined to the main surface portion 31 of the floor panel 3 and the upper surface of the step portion 34. Flange portions $11Af_3$ extending upward, forward, and rearward from a vehicle width direction outer end edge of the outer rear seat bracket 11A are formed in a vehicle width direction outer end of the outer rear seat bracket 11A. These flange portions $11Af_3$ are joined to a vehicle width direction inner side surface of the sill inner 1A. The outer rear seat bracket 11A has a vertical wall 11Aa parallel to the vehicle body front-rear direction, at its vehicle width direction inner end. A lower end of the vertical wall 11Aa is provided with a flange portion $11Af_4$ which extends inward in the vehicle width direction from an edge of this lower end. The flange portion $11Af_4$ is joined to the floor panel 3. The outer rear seat bracket 11A thus forms a closed cross section structure together with the first frame member 7, the side sill 1, and the floor panel 3.

The inner rear seat bracket 11B has a hat-shaped cross section opening downward in a cross section perpendicular to the vehicle width direction. As illustrated in FIG. 3, flange portions $11Bf_1$, $11Bf_2$ of the inner rear seat bracket 11B are joined to the upper surface of the floor panel 3. Flange portions $11Bf_3$ which extend upward, forward, and rearward from a vehicle width direction inner end edge of the inner rear seat bracket 11B are formed in a vehicle width direction inner end of the inner rear seat bracket 11B. These flange portions $11Bf_3$ are joined to the vehicle width direction outer side surface of the center portion 21 of the center tunnel 2. The inner rear seat bracket 11B has a vertical wall 11Ba parallel to the vehicle body front-rear direction, at its vehicle width direction outer end. A lower end of the vertical wall 11Ba is provided with a flange portion $11Bf_4$ which extends outward in the vehicle width direction from an edge of this lower end. The flange portion $11Bf_4$ is joined to the floor panel 3. The inner rear seat bracket 11B thus forms a closed cross section structure together with the center tunnel 2 and the floor panel 3.

As illustrated in FIG. 3, the vehicle seats SC are arranged on the front cross members 10 and the rear seat brackets 11A, 11B. Each of the left and right vehicle seats SC includes a seat main body and seat rails (not illustrated) supporting the seat main body. The seat rails are fixed to the vehicle body via fixation portions $F_1$ to $F_4$, two on the front and two on the rear (total of four). The front fixation portions $F_1$, $F_2$ are fixed respectively to base portions formed on upper surfaces of the front seat brackets 10A, 10B by using fastening members such as bolts. The outer rear fixation portion $F_3$ is fixed to a base portion formed to protrude from an upper portion of the outer rear seat bracket 11A by using a fastening member such as a bolt, and the inner rear fixation portion $F_4$ is fixed to a base portion formed on an upper surface of the inner rear seat bracket 11B by using a fastening member such as a bolt.

As illustrated by broken lines in FIGS. 2 and 3, the center tunnel 2 is provided with a mount member 12 for supporting a propeller shaft (not illustrated). A bearing unit (not illustrated) by which the propeller shaft is rotatably supported is fixed to the mount member 12 by using a fastening member such as a bolt. The mount member 12 has an inverted U-shape as viewed in the vehicle body front-rear direction and is provided along an inner surface of the center portion 21 of the center tunnel 2. The mount member 12 has a hat-shaped cross section opening upward and outward in the vehicle width direction. Flange portions of the mount member 12 are joined to an inner surface of the center portion 21 of the center tunnel 2 to form a closed cross section together with the center portion 21.

As illustrated in FIG. 3, the mount member 12 is arranged at substantially the same position as the inner rear seat brackets 11B in the vehicle body front-rear direction and is connected to both of the left and right inner rear seat brackets 11B. In other words, the rear ends of the respective second frame members 8 are connected also to the mount member 12.

Note that, in this description, the term "connect" means coupling frame members to each other with relatively high coupling rigidity. Accordingly, two frame members "connected" to each other provide a load path which can directly transmit collision load or the like inputted into one of the frame members to the other frame member. The term "connect" includes directly coupling frame members to each other without using other members, but is not limited to this and includes coupling multiple frame members to one high-rigidity member (for example, a closed cross section structural member) to couple the multiple frame members via the high-rigidity member. "Connecting" frame members having closed cross sections to each other include not only coupling the frame members such that the closed spaces thereof are continuous but also coupling the frame members such that the closed spaces thereof are adjacent to each other while being separated by one plate member. Moreover, the term "join" in this description mainly means joining parts or the like by welding such as spot welding, but is not limited to this and includes bonding by structural adhesive or the like and joining by both of welding and bonding.

Operations and possible effects of the vehicle body lower structure S1 according to one or more embodiments of the present invention are described below.

(1) In the vehicle body lower structure S1, one of the first and second frame members 7, 8 is provided on the upper surface of the floor panel 3 and the other one is provided on the lower surface of the floor panel 3. Accordingly, a height difference between the center of the cross section of the main body portion 41 in the front side member 4 and the center of the cross section of the frame members 7, 8 is smaller than that in the case where both frame members 7, 8 are provided on the lower surface of the floor panel 3. Hence, it is possible to reduce moment (for example, rotational moment about an axis extending in the vehicle width direction) inputted into the first and second frame members 7, 8 by collision load inputted into the main body portion 41 of the front side member 4 from the vehicle body front side in vehicle front collision. This can facilitate axial crushing (hinder bending deformation) of the first and second frame members 7, 8 and more surely transmit the aforementioned collision load to the vehicle body rear side via the first and second frame members 7, 8 when the first and second frame members 7, 8 are deformed by the aforementioned collision load.

Figure 6A:
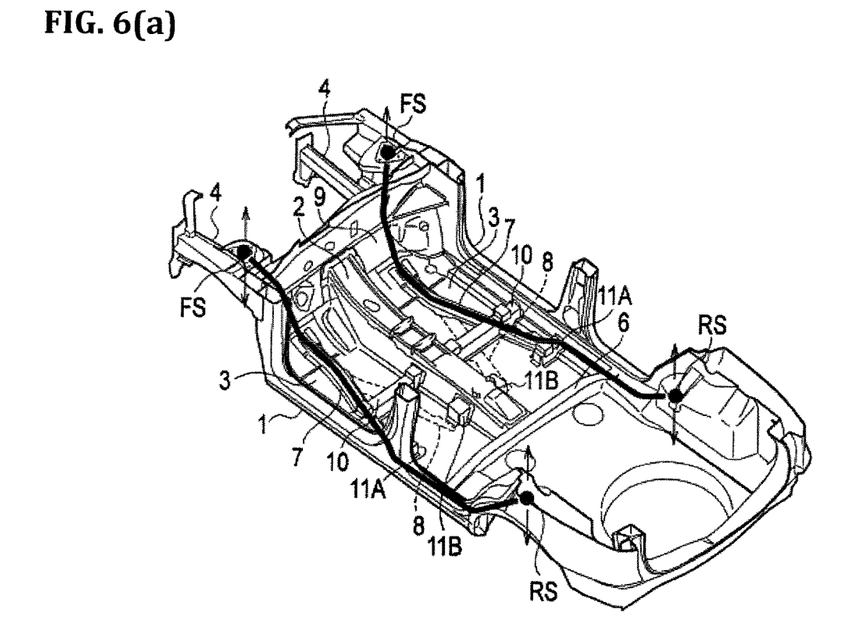
FIG. 6(a) illustrates the arrangement and shapes of main frame members which provide torsional rigidity in a vehicle body lower portion.

(2) As illustrated in FIG. 6(a), the vehicle body lower portion receives torsional load from a road surface at front strut attachment points FS and rear shock absorber attachment points RS (hereafter, referred to as load input points). In the conventional structure, the front side member extensions extending substantially parallel to the side sills, the rear seat cross extending in the vehicle width direction and connected to the rear end portions of the front side member extensions, and the side sills connected to both end portions of the rear seat cross in the vehicle width direction structurally connect the load input points in front and rear portions of the vehicle body to one another as the frame members of the vehicle body lower portion, and provide the torsional rigidity in the vehicle body lower portion. However, in this structure, multiple right-angle bent portions where the frame members are bent at right angle are formed in a section from the front strut attachment points FS to the rear shock absorber attachment points RS. For example, in the frame members on the vehicle body right side, the right-angle bent portions are formed at at least two portions of a connection portion between the front side member extension and the rear seat cross and a connection portion between the rear seat cross and the side sill. In the conventional structure, when torsional load is inputted, these right-angle bent portions become nodes of deformation and a torsional displacement amount in the vehicle body lower portion is thereby increased.

In the vehicle body lower structure S1, the first frame member 7 connected to the front side member 4 extends obliquely such that the first frame member 7 is located more outward in the vehicle width direction as extending toward the vehicle body rear side, and is connected to the side sill 1. Accordingly, the number of right-angle bent portions in the frame members is reduced (at least the aforementioned two right-angle bent portions are not present). This suppresses the torsional deformation amount in torsional load input and improves the torsional rigidity. Moreover, as illustrated in FIG. 6(a), since the load input points FS, RS in the front and rear portions of the vehicle body are connected to one another by frame members extending more linearly (that is, by shorter frame members), the torsional rigidity of the vehicle body lower portion can be improved efficiently (while achieving weight reduction).

(3) Moreover, when load in collision from the vehicle body front side such as offset collision is inputted to one side of a vehicle body front face (in one-side collision), in some cases, a power train in the vehicle front portion is turned clockwise or counterclockwise in the plan view and load acting inward in the vehicle width direction and toward the vehicle body rear side is inputted into the vehicle body lower portion via the attachment point 5A of the front suspension member 5 or the like.

In the vehicle body lower structure S1, the second frame member 8 extends in the direction inward in the vehicle width direction and toward the vehicle body rear side which is the same as the input direction of the aforementioned load, that is extends obliquely such that the second frame member 8 is located more inward in the vehicle width direction as extending toward the vehicle body rear side, and is connected to the center tunnel 2. Accordingly, it is possible to efficiently transmit the load in one-side collision to the center tunnel 2 and reduce the deformation amount of the floor panel 3 in deformation.

(4) Furthermore, in the vehicle body lower structure S1, the first and second frame members 7, 8 connected to the front side member 4 are connected respectively to the side sill 1 and the center tunnel 2. Accordingly, it is possible to use the side sill 1 and the center tunnel 2 as load paths of collision load and efficiently distribute stress generated in front collision. Hence, the weight of the vehicle body can be further reduced.

(5) Particularly, in the vehicle body lower structure S1, the first frame member 7 providing the torsional rigidity in the vehicle body lower portion as described above is provided on the upper surface of the floor panel 3. Since the load input points FS, RS are connected to each other by shorter members than those in the case where the first frame member 7 is provided on the lower surface of the floor panel 3, the torsional rigidity in the vehicle body lower portion can be efficiently improved.

(6) Moreover, in the vehicle body lower structure S1, the first frame member 7 connected to the side sill 1 is provided on the upper surface of the floor panel 3. Accordingly, the height difference between the center of the cross section of the first frame member 7 and an input point of collision load (side collision load) inputted into a vehicle body side surface from a vehicle body side in side collision can be made smaller than that in the case where the first frame member 7 is provided on the lower surface of the floor panel 3. The transmission efficiency of side collision load via the first frame member 7 can be thereby improved.

(7) Furthermore, in the vehicle body lower structure S1, the second frame member 8 is provided on the lower surface of the floor panel 3. Accordingly, the height difference between the attachment point 5A of the front suspension member 5 and the center of the cross section of the second frame member 8 is smaller than that in the case where the second frame member 8 is provided on the upper surface of the floor panel 3. Thus, it is possible to reduce moment inputted into the second frame member 8 by collision load (particularly, load in the direction inward in the vehicle width direction and toward the vehicle body rear side) input into the vehicle body lower portion via the attachment point 5A of the front suspension member 5 and the like in one-side collision. This can further facilitate the axial crushing of the second frame member 8 and transmit the aforementioned load to the center tunnel 2 at higher efficiency when the second frame member 8 is deformed by the aforementioned collision load.

(8) Moreover, in the vehicle body lower structure S1, the positions of the bent points $P_1$, $P_2$ provided in the first and second frame members 7, 8 are shifted from each other in the vehicle body front-rear direction. Accordingly, when collision load is inputted from the vehicle body front side, stress is distributed to the bent points $P_1$, $P_2$ without being concentrated at one point and collision energy can be efficiently absorbed.

Figure 6B:
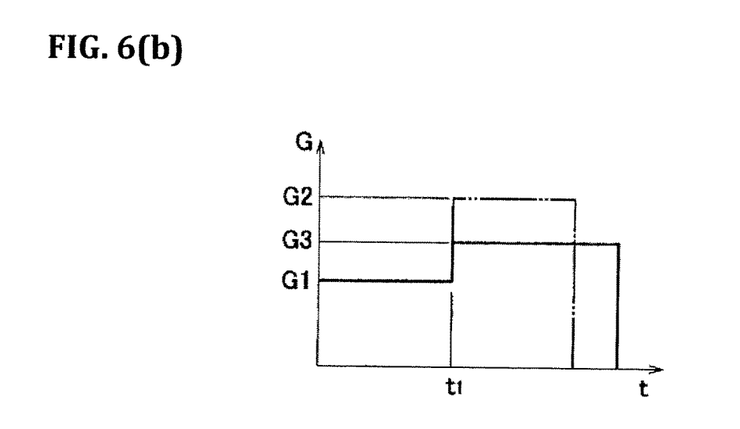
FIG. 6(b) is a graph illustrating tendency of reduction of vehicle body reaction force.

(9) Furthermore, shifting the positions of the bent points $P_1$, $P_2$ can shift the start position and timing of bending deformation in the frame members 7, 8 in deformation or cause the bending deformation in these members to occur in stages. FIG. 6(b) is a graph depicting a trend of change in vehicle body reaction force generated in the deformation over time. Shifting the positions of the bent points $P_1$, $P_2$ reduces the maximum value of the vehicle body reaction force after start of belt restraint (after time t1) to value G3 which is lower than value G2 in the case where the positions of the bent points are not shifted. The deceleration acting on the occupant after the start of belt restraint can be thereby reduced.

(10) When collision load is inputted into the main body portion 41 of the front side member 4 from the vehicle body front side, greater axial stress tends to be generated in the first frame member 7 on the upper surface of the floor panel 3 than in the second frame member 8 on the lower surface of the floor panel 3. In the vehicle body lower structure S1, since the first bent point $P_1$ of the first frame member 7 in which greater axial stress is generated is located on the vehicle body front side of the second bent point $P_2$ of the second frame member 8, it is possible to surely cause bending deformation of the frame member 7 before bending deformation of the frame member 8.

(11) Particularly, in the vehicle body lower structure S1, the bent points $P_1$, $P_2$ are located on the vehicle body rear side of the rear end of the toe board portion 32. Accordingly, deformation of the dash panel 9 in vehicle front collision is not greatly hindered by the first and second frame members 7, 8 until the deformation reaches the rear end of the toe board portion 32.

(12) Moreover, in the vehicle body lower structure S1, the front suspension member 5 is attached to the rear end portion of the front side member 4, on the vehicle body front side of the toe board kick portion 33. Accordingly, collision load inputted into the front suspension member 5 from the vehicle body front side can be more surely transmitted to the first and second bent points $P_1$, $P_2$ on the vehicle body rear side of the toe board kick portion 33.

(13) Furthermore, in the vehicle body lower structure S1, the rear seat brackets 11A, 11B are arranged side by side, and spaced away from each other, in the vehicle width direction. The front cross member 10 is omitted and the weight of the vehicle body can be thus reduced by an amount corresponding to the omission. Meanwhile, the first and second frame members 7, 8 are connected respectively to the rear seat brackets 11A, 11B. Accordingly, it is possible to suppress an increase in displacement of the rear seat brackets 11A, 11B in front collision which is caused by the omission of the front cross member 10. This can suppress an increase in a deformation amount of the vehicle seat SC.

(14) Moreover, in the vehicle body lower structure S1, since the second frame member 8 is connected to the mount member 12, it is possible to use the mount member 12 as a load path and more surely transmit collision load inputted into the second frame member 8 to the center tunnel 2 via the mount member 12. Particularly, the second frame member 8 can be more effectively used as a load path in one-side collision.

<Second Embodiment>

Next, a vehicle body lower structure S2 according to a second embodiment is described with reference to FIGS. 7 and 8(a)-8(c). Points different from the vehicle body lower structure S1 is mainly described below. The same components as those in the vehicle body lower structure S1 are denoted by the same reference numerals and description thereof is omitted.

Figure 7:
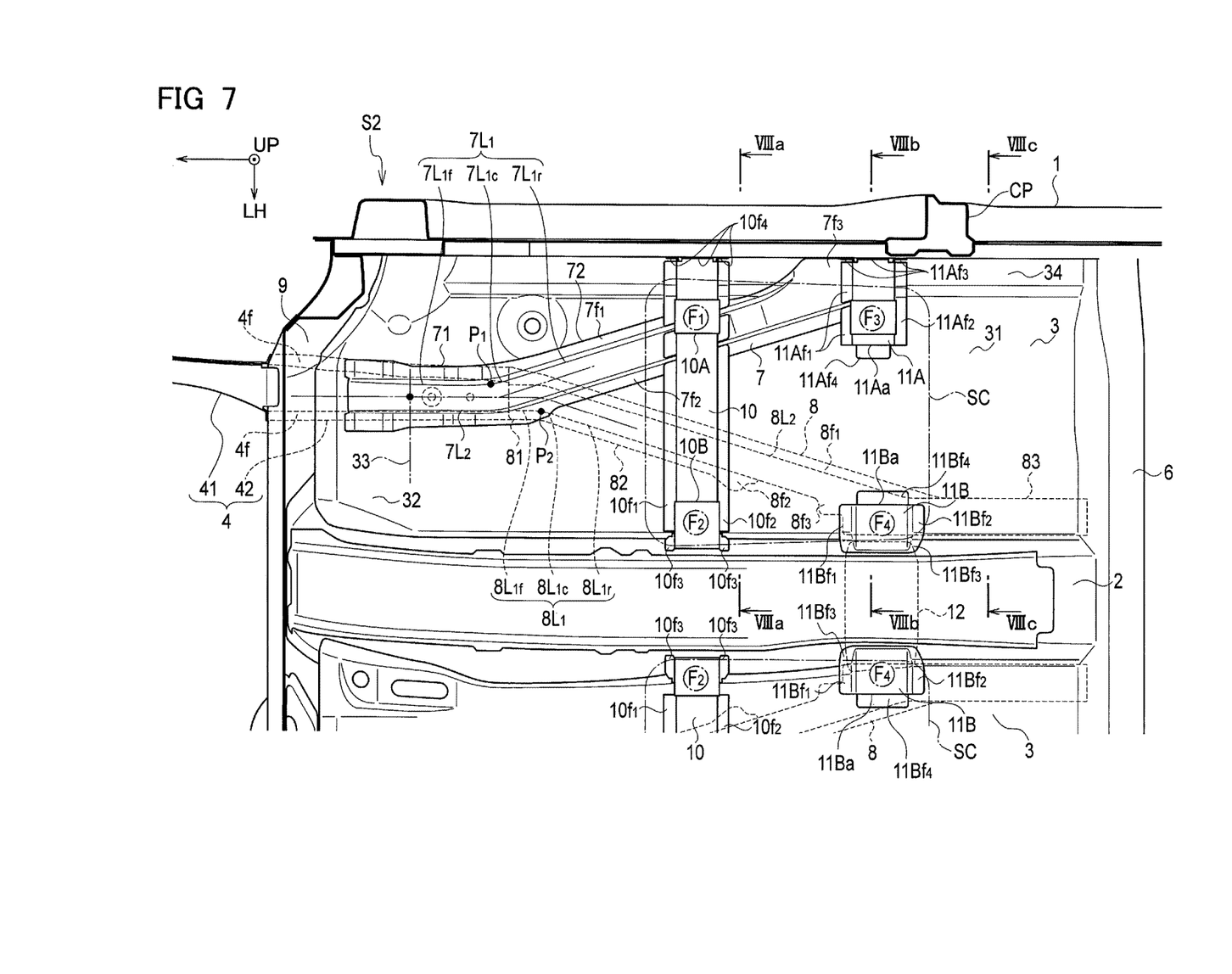
FIG. 7 is a plan view illustrating a vehicle body lower structure according to a second embodiment of the present invention.

In the vehicle body lower structure S2, as illustrated in FIG. 7, each second frame member 8 includes, in addition to the front portion 81 which extends substantially linearly in the vehicle body front-rear direction and the rear portion 82 which extends substantially linearly from the rear end of the front portion 81 in the direction inward in the vehicle width direction and toward the vehicle body rear side, an extended portion 83 which extends substantially linearly from the rear end of the rear portion 82 in the vehicle body front-rear direction. The extended portion 83 is provided to extend from the inner rear seat bracket 11B to the seat cross member 6, along the center tunnel 2. A rear end portion of the extended portion 83 overlaps the seat cross member 6 in the plan view or is adjoined to the seat cross member 6.

Figure 8A:
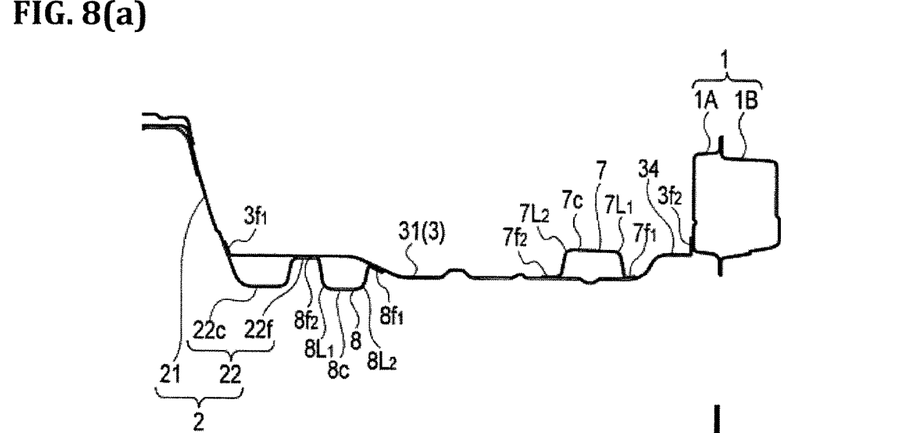
FIG. 8(a) illustrates a cross section along the line VIIIa-VIIIa in FIG. 7.
Figure 8B:
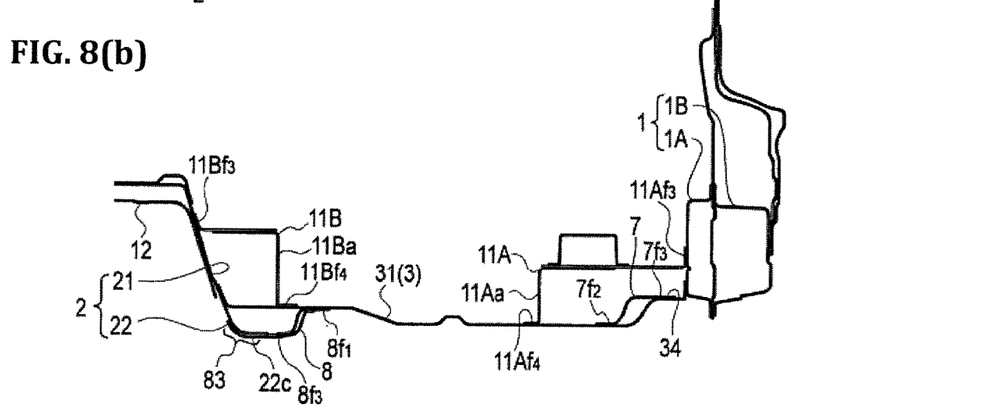
FIG. 8(b) illustrates a cross section along the line VIIIb-VIIIb in FIG. 7.
Figure 8C:
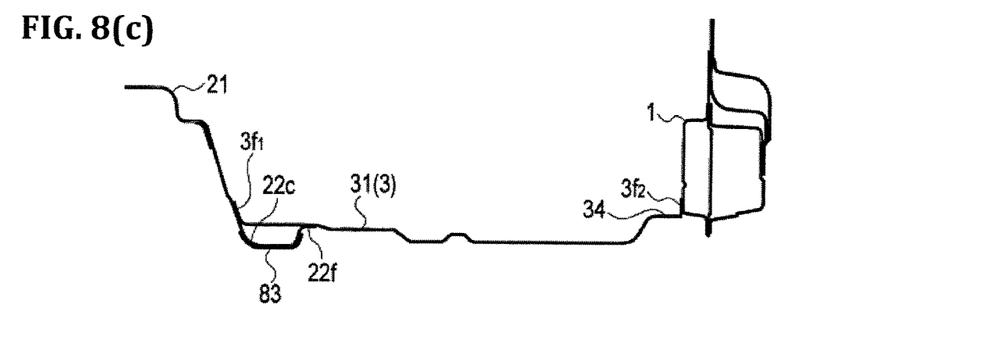
FIG. 8(c) illustrates a cross section along the line VIIIc-VIIIc in FIG. 7.

As illustrated in FIGS. 8(b)-8(c), the extended portion 83 has a channel shape opening upward in a cross section perpendicular to the vehicle body front-rear direction. This channel shape corresponds to a shape in which a vehicle width direction inner end of the flange portion $8f_3$ of the second frame member 8 in the vehicle body lower structure S1 is extended inward in the vehicle width direction along the lower surface of the channel-shaped cross section portion 22c of the tunnel reinforcement portion 22. The extended portion 83 is joined to the lower surface of the channel-shaped cross section portion 22c of the tunnel reinforcement portion 22. A channel-shaped space defined by the extended portion 83 partially coincides with the closed space in the closed cross section structure formed by the tunnel reinforcement portion 22 and the floor panel 3, in a cross section perpendicular to the vehicle body front-rear direction.

Since the vehicle body lower structure S2 has a similar configuration as the vehicle body lower structure S1, one or more of the aforementioned effects (1) to (14) may be obtained in the vehicle body lower structure S2.

(15) In addition, in the vehicle body lower structure S2, since the second frame member 8 includes the extended portion 83 by which the second frame member 8 is extended to the seat cross member 6 along the center tunnel 2, collision load inputted into the vehicle body lower portion in front collision (particularly, one-side collision) can be transmitted to the center tunnel 2 and the seat cross member 6 in a distributed manner. This allows the second frame member 8 to be more efficiently used as a load path and enables further reduction of a deformation amount of the floor panel 3 in deformation.

(16) Moreover, in the vehicle body lower structure S2, the extended portion 83 extends from the inner rear seat bracket 11B to the seat cross member 6. Accordingly, in vehicle front collision, load in a direction toward the vehicle body front side which is inputted into the inner rear seat bracket 11B from a not-illustrated belt anchor via the not-illustrated seat rail can be transmitted to the seat cross member 6 via the extended portion 83. This can reduce local deformation of the inner rear seat bracket 11B.

Although embodiments of the present invention have been described above, these embodiments are merely examples described to facilitate the understanding of the present invention, and the present invention is not limited to the embodiments. The technical scope of the present invention is not limited to the specific technical matters disclosed in the aforementioned embodiments and includes various modifications, changes, alternative techniques, and the like which can be easily derived from the disclosed matters.

For example, although the first frame member 7 is provided on the upper surface of the floor panel 3 and the second frame member 8 is provided on the lower surface of the floor panel 3 in one or more of the aforementioned embodiments, the configuration may be such that the first frame member 7 is provided on the lower surface of the floor panel 3 and the second frame member 8 is provided on the upper surface of the floor panel 3. In this case, according to one or more embodiments of the present invention, at least the effects (1) to (4) described above may be obtained.

Moreover, although the first bent point $P_1$ is arranged on the vehicle body front side of the second bent point $P_2$, away therefrom by the predetermined distance in one or more of the aforementioned embodiments, the first bent point $P_1$ may be arranged on the vehicle body rear side of the second bent point $P_2$, away therefrom by the predetermined distance. In this case, according to one or more embodiments of the present invention, at least the effects (8) and (9) described above may be obtained.

Furthermore, although the rear portions 72, 82 of the first and second frame members 7, 8 have linear shapes, the rear portions 72, 82 may have curved shapes. However, frame members having linear shapes are more likely to be axially crushed when deformed by the aforementioned collision load, and the aforementioned collision load can be further transmitted to the vehicle body rear side via the first and second frame members 7, 8.

Moreover, the arrangement and shapes of the coupling portions of the front side member 4, the first frame member 7, and the second frame member 8 are not limited to those in the aforementioned embodiments. For example, although the three members of the front side member 4, the first frame member 7, and the second frame member 8 are each coupled to the other members in one or more of the aforementioned embodiments, two of the three members may be coupled to each other via the remaining member. Specifically, the first frame member 7 and the second frame member 8 may be coupled to each other via the front side member 4 or one of the first and second frame members 7, 8 may be coupled to the front side member 4 via the other one. Moreover, for example, although the front end of the second frame member 8 and the rear end of the front side member 4 are joined to each other on the rear side of the attachment point 5A of the front suspension member 5 in one or more of the aforementioned embodiments, these ends may be joined to each other on the front side of the attachment point 5A. Furthermore, the cross sectional shapes (for example, the hat-shaped cross sections) of the respective frame members and the arrangement, shapes, sizes, and the like of the joining portions (for example, the flange portions) are not limited to those disclosed in the aforementioned embodiment and can be appropriately selected depending on various conditions such as required strength and spatial restrictions, as a matter of course.

One or more embodiments of the present invention can be applied to a vehicle body lower structure of a vehicle such as a car.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

S1, S2 vehicle body lower structure
1 side sill
2 center tunnel
3 floor panel
   31 main surface portion
   32 toe board portion (tilted surface portion)
4 front side member
6 seat cross member
7 first frame member
8 second frame member
   83 extended portion
   $P_1$ first bent point
   $P_2$ second bent point
SC vehicle seat
$F_3$, $F_4$ rear fixation portion (first fixation portion, second fixation portion)
11A outer rear seat bracket (first seat bracket)
11B inner rear seat bracket (second seat bracket)
12 mount member

The invention claimed is:

1. A vehicle body lower structure comprising:
a side sill;
a center tunnel;
a floor panel disposed between the side sill and the center tunnel;
a first frame member connected to a front side member; and
a second frame member connected to the front side member,
wherein the first frame member extends obliquely such that, as the first frame member extends further rearward, the first frame member extends further outward in a vehicle width direction,
wherein the first frame member is connected to the side sill,
wherein the second frame member extends obliquely such that, as the second frame member extends further rearward, the second frame member extends further inward in the vehicle width direction,
wherein the second frame member is connected to the center tunnel,
wherein one of the first frame member and the second frame member is provided on an upper surface of the floor panel, and the other one of the first frame member and the second frame member is provided on a lower surface of the floor panel, and
wherein an outer end in the vehicle width direction of the first frame member is connected to the side sill near a base portion of a center pillar.

2. The vehicle body lower structure according to claim 1, wherein the first frame member is provided on the upper surface of the floor panel and the second frame member is provided on the lower surface of the floor panel.

3. The vehicle body lower structure according to claim 1,
wherein the center tunnel is provided with a mount member by which a propeller shaft is to be rotatably supported, and
wherein the second frame member is connected to the mount member.

4. A vehicle body lower structure comprising:
a side sill;
a center tunnel;
a floor panel disposed between the side sill and the center tunnel;
a first frame member connected to a front side member; and
a second frame member connected to the front side member,
wherein the first frame member extends obliquely such that, as the first frame member extends further rearward, the first frame member extends further outward in a vehicle width direction,
wherein the first frame member is connected to the side sill,
wherein the second frame member extends obliquely such that, as the second frame member extends further rearward, the second frame member extends further inward in the vehicle width direction,
wherein the second frame member is connected to the center tunnel,
wherein one of the first frame member and the second frame member is provided on an upper surface of the floor panel, and the other one of the first frame member and the second frame member is provided on a lower surface of the floor panel,
wherein the first frame member is bent outward in the vehicle width direction at a first bent point,
wherein the second frame member is bent inward in the vehicle width direction at a second bent point, and
wherein a position of the first bent point is shifted from a position of the second bent point in a vehicle body front-rear direction.

5. The vehicle body lower structure according to claim 4, wherein the first bent point is located on a vehicle body front side of the second bent point.

6. The vehicle body lower structure according to claim 4,
wherein a front portion of the floor panel is provided with a tilted surface portion which is joined to a dash panel and which is titled upward toward a vehicle body front side, relative to a main surface portion of the floor panel, and
wherein the first bent point and the second bent point are located on a vehicle body rear side of a rear end of the tilted surface portion.

7. A vehicle body lower structure comprising:
a side sill;

a center tunnel;

a floor panel disposed between the side sill and the center tunnel;

a first frame member connected to a front side member; and a second frame member connected to the front side member, wherein the first frame member extends obliquely such that, as the first frame member extends further rearward, the first frame member extends further outward in a vehicle width direction, wherein the first frame member is connected to the side sill, wherein the second frame member extends obliquely such that, as the second frame member extends further rearward, the second frame member extends further inward in the vehicle width direction, wherein the second frame member is connected to the center tunnel, wherein one of the first frame member and the second frame member is provided on an upper surface of the floor panel, and the other one of the first frame member and the second frame member is provided on a lower surface of the floor panel, wherein a rear portion of the floor panel is provided with a seat cross member extending in the vehicle width direction, and wherein the second frame member includes an extended portion extending to the seat cross member along the center tunnel.

8. The vehicle body lower structure according to claim 1, further comprising:

a first seat bracket to which a first fixation portion of a vehicle seat is to be fixed; and a second seat bracket to which a second fixation portion of the vehicle seat is to be fixed, wherein the first and second seat brackets are arranged side by side, and spaced away from each other, in the vehicle width direction, wherein the first frame member and the side sill are connected to the first seat bracket, and wherein the second frame member and the center tunnel are connected to the second seat bracket.

9. The vehicle body lower structure according to claim 8, wherein a rear portion of the floor panel is provided with a seat cross member extending in the vehicle width direction, wherein the second frame member includes an extended portion extending to the seat cross member along the center tunnel, and wherein the extended portion of the second frame member extends from the second seat bracket to the seat cross member.

* * * * *